United States Patent
Smith

(10) Patent No.: US 7,131,477 B2
(45) Date of Patent: Nov. 7, 2006

(54) BEAD LOCK

(76) Inventor: Roger Smith, 25 Quamby Road, Ringwood, Victoria 3134 (AU)

( * ) Notice: Subject to any disclaimer, the term of this patent is extended or adjusted under 35 U.S.C. 154(b) by 66 days.

(21) Appl. No.: 10/787,282

(22) Filed: Feb. 26, 2004

(65) Prior Publication Data

US 2005/0167023 A1 Aug. 4, 2005

(30) Foreign Application Priority Data

Jan. 30, 2004 (AU) ............................. 2004200306

(51) Int. Cl.
*B60C 17/01* (2006.01)
(52) U.S. Cl. .................... 152/400; 152/340.1; 152/518
(58) Field of Classification Search ................ 152/157, 152/158, 159, 267, 379.3, 379.4, 379.5, 381.5, 152/381.6, 382, 383, 384, 396, 399, 400, 152/516, 518, 520, 339.1, 501
See application file for complete search history.

(56) References Cited

U.S. PATENT DOCUMENTS

| | | | |
|---|---|---|---|
| 1,626,511 A * | 4/1927 | Clark ........................ | 152/400 |
| 2,675,846 A * | 4/1954 | Wyman .................... | 152/340.1 |
| 2,680,463 A * | 6/1954 | Khalil ...................... | 152/339.1 |
| 2,731,061 A * | 1/1956 | Clark ........................ | 152/341.1 |
| 3,064,704 A * | 11/1962 | Richard .................... | 152/339.1 |
| 3,191,654 A * | 6/1965 | Anderson et al. ......... | 152/341.1 |
| 3,476,168 A * | 11/1969 | Huber et al. .............. | 152/427 |
| 3,993,114 A | 11/1976 | Hinderks .................... | 152/340 |
| 4,153,095 A | 5/1979 | Sarkissian .................. | 152/340 |
| 4,263,953 A * | 4/1981 | Miceli ........................ | 152/158 |
| 4,995,438 A | 2/1991 | Weber et al. ............... | 152/518 |
| 5,035,273 A * | 7/1991 | Ruvio ........................ | 152/340.1 |
| 5,246,050 A | 9/1993 | Stucker et al. ............. | 152/518 |
| 5,479,976 A | 1/1996 | Cho ........................... | 152/518 |
| 5,679,184 A * | 10/1997 | Hosking ..................... | 152/157 |
| 6,688,359 B1 * | 2/2004 | Blalock et al. ............. | 152/523 |

* cited by examiner

*Primary Examiner*—Russell D. Stormer
(74) *Attorney, Agent, or Firm*—Fattibene & Fattibene; Paul A. Fattibene; Arthur T. Fattibene

(57) ABSTRACT

A bead lock including an insert casing and a bead spacer for providing an air passageway in a vehicle tire to be mounted on a wheel rim on which is located an insert valve and a rim lip for retention of the vehicle tire bead, the insert casing including an insert bead adapted to push against the tire bead and to hold the tire bead firmly against the inner surface of the rim lip, the inner wall of the vehicle tire and the outer surface of the insert casing defining an internal tire space to be pressurized for inflation of the vehicle tire or depressurized for the deflation of the vehicle tire via the insert valve, the tire bead and the insert bead interposed between the internal tire space and the insert valve, the bead spacer extending from the insert bead to an insert valve area corresponding in use to the insert valve location whereby to define at least one air passage for communication of the internal tire space with the insert valve, wherein the bead spacer is made of material sufficiently flexible to substantially conform to the contours of the wheel rim and sufficiently incompressible to provide the air passageway.

26 Claims, 7 Drawing Sheets

BEAD LOCK

FIELD OF THE INVENTION

The present invention relates to a bead lock for off-road or low tire pressure applications.

BACKGROUND OF THE INVENTION

The following description of the prior art is not intended to be, nor should it be interpreted as, an indication of the common general knowledge pertaining to the invention.

A common problem faced in off-road applications is that the tire bead may become separated from the wheel rim when operating the vehicle at low tire pressures. Particularly in off-road applications, the tires are commonly subjected to substantial lateral forces and, without reinforcement, a standard tire bead may become disassociated from the wheel rim. This is particularly so in off-road racing, extreme off-road conditions or where very low tire pressures are involved.

Another issue involves use of low profile tires. In such tires the space between road hazards such as small solid objects and the wheel rim is small and may lead to rim damage where the object can make a damaging impact on the rim. Moreover, the difference between an inflated low profile tire and an unintentionally deflated tire may be minimal and leave the driver unaware of the deflated condition of a tire (particularly on a rear wheel, also leading to rim damage or tire side wall damage or both).

In the trucking industry a common technique employed where greater tire traction is required is to partially deflate the tires. Such situations may arise on muddy work sites or where heavy vehicles such as timber jinkers are required to travel along unmade roads. One hazard in such applications is that the tire bead of one of the tires may become disassociated with its wheel rim.

A number of bead lock type devices have been proposed. For example, the Tireloc (Reg™) bead lock system includes an inner casing interposed between the inner surface of a pneumatic tire and the rim and encloses a small inner tube. The inner tube is inflated so that the inner casing bears against the inner surface of the tire bead, thereby locking it against the wheel rim. One advantage of such a system is that, in the event of a puncture, the wheel may still be serviceable to the extent that the inner casing arrangement protects tire from being damaged by the wheel rim. Moreover, and more particularly for off-road applications, the pneumatic tire may be deflated to substantially increase the traction of the tire whilst maintaining the inner tube in a fully inflated condition to protect the tire bead against the wheel rim and to retain the tire bead on the wheel rim.

The Tireloc system includes a solid rubber plate with longitudinal grooves to enable the inflation of the pneumatic tire. This solid rubber plate is relatively heavy and may require wheel balancing to compensate. Although the solid rubber plate is partially flexible, it is insufficiently flexible to follow the contours of the wheel rim without, over time, suffering fatigue and eventual breakage, thereby requiring costly and inconvenient replacement. In addition, these components are relatively expensive to manufacture and it is therefore desirable that a cheaper alternative be available.

SUMMARY OF THE INVENTION

Accordingly, in one aspect of the invention there is provided a bead lock including an insert casing and a bead spacer for providing an air passageway in a vehicle tire to be mounted on a wheel rim on which is located an insert valve and a rim lip for retention of the vehicle tire bead, said insert casing including an insert bead adapted to push against said tire bead and to hold said tire bead firmly against the inner surface of said rim lip, the inner wall of said vehicle tire and the outer surface of said insert casing defining an internal tire space to be pressurized for inflation of said vehicle tire or depressurized for the deflation of said vehicle tire via said insert valve, said tire bead and said insert bead interposed between said internal tire space and said insert valve, said bead spacer extending from said insert bead to an insert valve area corresponding in use to said insert valve location whereby to define at least one air passage for communication of said internal tire space with said insert valve, wherein said bead spacer is made of material sufficiently flexible to substantially conform to the contours of said wheel rim and sufficiently incompressible to provide said air passageway.

When used in this specification and claims, the term "internal tire space" means the space between the inner wall of the vehicle tire and the outer surface of the insert casing, and the term "bead lock space" means the space between the internal surface of the insert casing and the external surface of the inner tube.

The bead spacer may be made from a material having a similar or lesser density compared to the components of the insert casing. The bead spacer may be made from the same material as the other components of the insert casing, for example using woven synthetic or natural fibres. However, provided the material is sufficiently flexible and incompressible, the bead spacer may be made from non-woven materials which include plastic polymeric materials, rubber compounds, metal and silicon-based compounds or a mixture or composite thereof.

The bead spacer may be made from metal mesh or chain mail, optionally with a plastic or other non-abrasive sleeve, sheath, or cover film to protect the tire or insert from damage caused by abrasion over time. The bead spacer may be made of a porous material through which air may travel whereby to provide the requisite air passage. The bead spacer may include a solid material interposed with one or more compression-resistant conduits to provide the air passage. Preferably the bead spacer comprises a plurality of spaced flexible, incompressible and parallel members defining therebetween the one or more air passages.

The bead spacer may be inserted into position after the insert casing is installed and held in place by the dual action of the tight-fitting beads and the inflation of the inner tube. Alternatively, the preferably light weight bead spacer may be mounted to the insert casing. The bead spacer may be attached to the insert bead. For example, the bead spacer may be welded, glued by adhesive, vulcanised, stitched or stapled to the insert bead or may be rigidly clamped, for example, using spring clips or screw clamps.

The bead spacer may be made from a woven material. The weave is preferably tight to ensure that the bead spacer is substantially incompressible whereby to effectively perform as a spacer when subjected to high compressive forces.

The bead spacer may include at least two light weight spacers which together define the at least one passage. Preferably, the bead spacer includes a pair of light weight spacers which extend in parallel from above the insert bead to an area surrounding the insert valve location. The pair of light weight spacers define an air passage for the pressurisation or depressurisation of the vehicle tire. The tire bead and the insert bead are, in use, pushed hard against each other and the tire bead is pushed hard against the wheel rim in air-tight engagement.

The bead spacer may include a thick ribbon of woven material. The light weight spacer may comprise a ribbon of material folded over one or more times to improve its performance as a spacer. The light weight spacer may further be in the form of a rectangular strip. In one form, the light weight bead spacer may be made from a tightly woven polyester or similar fabric.

The bead spacer may be elongate in configuration to define an elongate passage communicating the internal tire space with the insert valve.

To protect the inner tube encased by the insert casing, advantageously the bead spacer may include an apron extending from the insert bead in use to the insert valve area. The apron may be made from a flexible material such as a sheet of polymeric material, soft rubber, leather or woven polyester or a similar fabric. The intention of the apron is to protect the inner tube from damage which may be caused by the base portion of the insert valve.

The insert valve may be of a standard type, such as that used for the main tire valve. The insert valve may have an added air escape feature in its base portion. For example, the base may include an elongate transverse groove whereby to facilitate the communication between the insert valve and the insert valve area. The apron may be sufficiently loosely woven to permit the passage of air through its fibres whilst providing a suitably protective surface for the inner tube against the abrasive effect of the base portion.

The apron may comprise a small extension or tab extending from or about the bead spacer. For example, the apron may comprise a tab extending from a free end of the light weight tab.

BRIEF DESCRIPTION OF THE DRAWINGS

The following is a brief description of the preferred embodiments with reference to the accompanying drawings. It is to be understood that the features illustrated in and described with reference to the drawings are not to be construed as limiting on the scope of the invention. In the drawings.

DETAILED DESCRIPTION OF THE PREFERRED EMBODIMENTS

Figure 1:
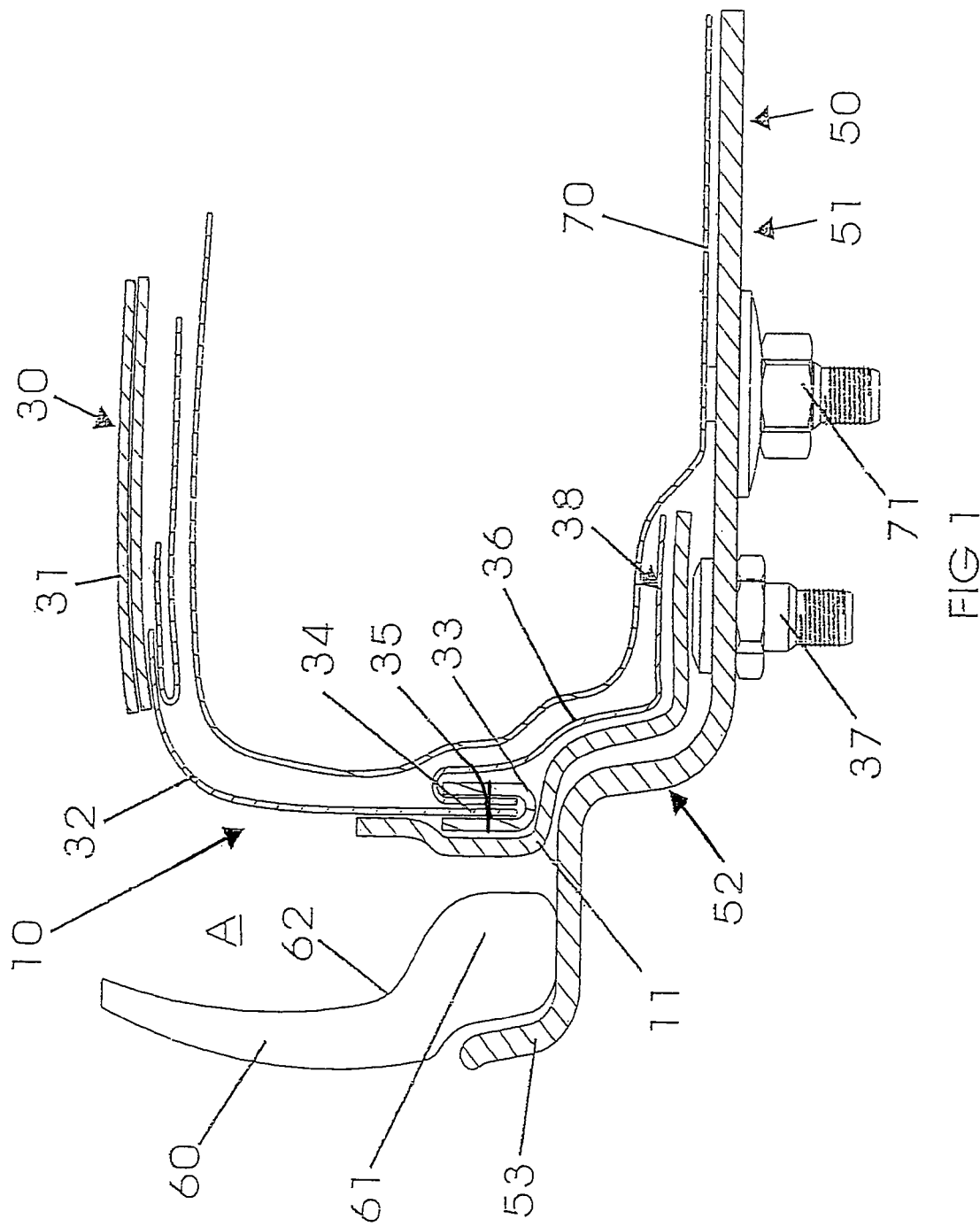
FIG. 1 is a cross sectional view of a portion of a wheel rim with a tire insert and bead spacer according to a first embodiment.

In FIG. 1 there is shown a bead spacer 10 installed on a wheel rim 50. Also installed on the wheel rim 50 is a pneumatic tire 60, an inner tube 70 and an insert casing 30 within the tire 60 and surrounding the inner tube 70.

As with most standard wheel rim types, the wheel rim 50 includes a broad area 51 suitable for the installation of a valve by the formation of an aperture through the wall of area 51. The wheel rim includes a shoulder 52 defining the annular seat corresponding to area 51. The wheel rim 50 terminates on each side with rim lips 53. However, FIG. 1 is limited to consideration of the side of the wheel on which the valves are mounted in accordance with standard or typical wheel rim designs. Accordingly, the shoulder 52 may be less exaggerated or non-existent, depending on the wheel rim type.

Seated in the rim lip 53 in accordance with standard wheel design practice, is a tire bead 61 of the pneumatic tire 60. When the pneumatic tire 60 is sufficiently inflated, the tire bead 61 is urged against the inner wall surface of the rim lip 53 for a stable and airtight seal. However, in off-road or low tire pressure applications, particularly because the air pressure is lowered for extra tire traction, floatation or ride comfort, this seal can be broken and the tire bead 61 may become dislodged from the rim lip 53 and the tire may even be damaged, thereby requiring repair or replacement.

The insert casing 30 includes a strong, flexible and substantially inelastic circular band 31 adapted to limit the radial expansion of the inner tube 70 when fully inflated. The insert casing 30 further includes side walls 32 on either side of the band 31 made of lighter gauge material than the band 31 and adapted to bear against the inner wall 62 of the pneumatic tire 60 when the inner tube 70 is sufficiently inflated, thereby urging the tire bead 61 into strong frictional engagement with the rim lip 53.

The side walls 32 terminate at their free edges in a lining of doubled over woven material forming an insert bead 33. The insert bead 33 is strongly affixed to the side wall edge 34. This may be achieved by adhesive, by one or more rows of stitching 35 or by a combination of both. Preferably, three rows of stitching are provided to ensure firm attachment of the insert bead to the insert casing side wall 32. Still more preferably, the side wall 32 is folded into two or more layers within the folded insert bead 33 to ensure greater adherence of the side wall 32 to the insert bead 33.

Also stitched within the folds of the insert bead 33 in the first embodiment is an apron 36 in use depending from the insert bead 33 down to the area surrounding an insert valve 37.

Figure 7:
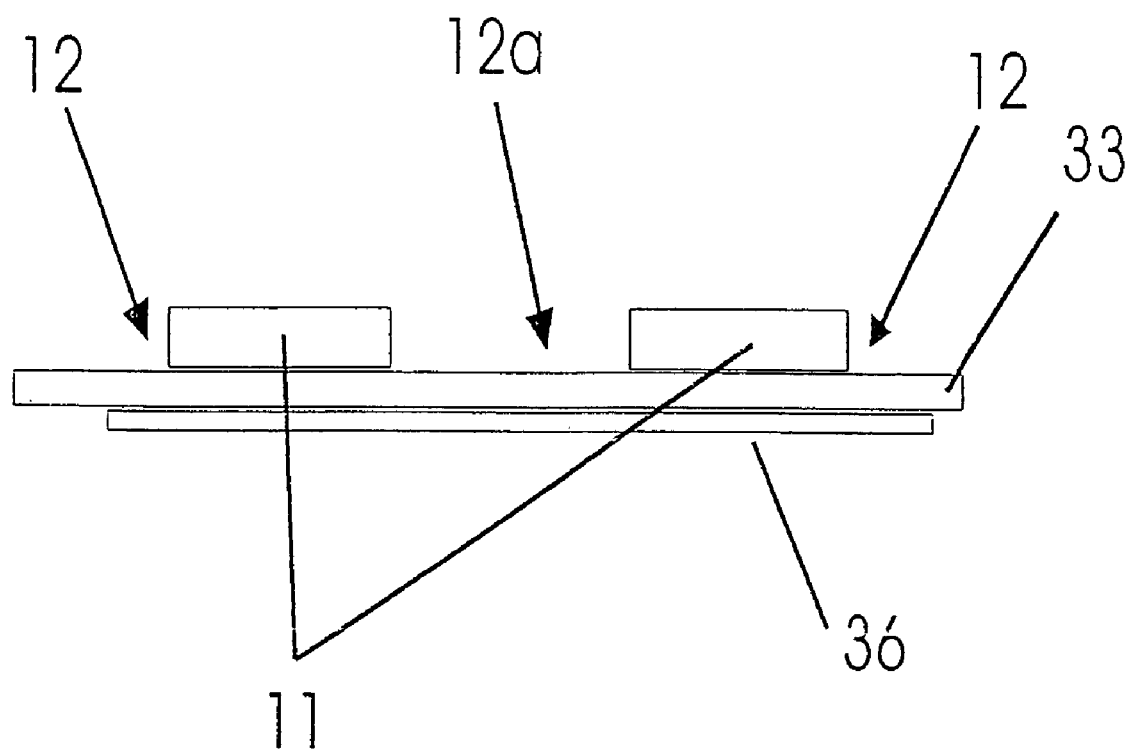
FIG. 7 is a top elevation of a bead spacer according to the first embodiment.

Also attached by stitching to the insert bead 33 are elongate spacers 11 extending from above the insert bead 33 down to the valve area 38 surrounding the insert valve 37. As best seen in FIG. 7, the insert bead 33, the elongate spacers 11 and the apron 36 are secured together whereby to provide a permanent and enduring attachment to one another, whether by stitching, welding, heat fusion, vulcanisation, adhesive or other suitable means.

In use, the internal tire space marked A of the pneumatic tire 60 is inflated by attaching inflating means to the insert valve 37 and forcing air through the valve 37 into a passage or passages 12 defined by the elongate spacers 11, the most effective passage being the central passage 12a corresponding to a corridor defined by each adjacent pair of elongate spacers 11. Advantageously, if the material used is sufficiently flexible and foldable, the elongate spacers 11 may be folded over in manufacture etc to increase their spacing effect in use.

In this connection, the elongate spacers 11 may be made from a solid material, such as synthetic or natural rubber, a polymer (including copolymers), a silicon based composite material or carbon fibre, or may be made from multiple components such as a hinged, segmented plastic arrangement, provided that the bead spacer is light weight. In a particularly preferred embodiment, the elongate spacers 11 are made from tightly woven polyester fibre.

By the operation of the elongate spacers 11, the passages 12 permit communication between the insert valve 37 and the internal space A thereby enabling the pneumatic tire 60 to be inflated.

The internal tube 70 may also be inflated for off-road or low tire pressure purposes or may be permanently inflated irrespective of the application to which the wheel is subjected. The inner tube 70 requires a separate aperture to be formed in the area 51 of the wheel rim 50 to accommodate an inner tube valve 71. Although FIG. 1 shows in cross section the insert valve 37 and inner tube valve 71 in a similar plane, this is primarily for illustrative purposes. In practice the valves 37, 71 will be located at different locations on the wheel rim 50 to avoid weakening the rim 50 by forming valve apertures too close together.

The inner tube 70 can therefore be inflated so that the insert casing side wall 32 bears against the inner tire wall 62 and the insert bead 33 abuts against the pneumatic tire bead 61 to hold the tire bead 61 in place. The band 31 strongly resists radial expansion whereby the expansionary force of the inner tube 70 is expressed through the insert casing side walls 32 so that the insert casing 30 assumes a low profile within the tire 60.

In off-road or low tire pressure applications where a lower pneumatic tire 60 pressure is desirable, the insert valve 37 may be activated whereby to deflate the tire space A of the pneumatic tire 60. For example, the pneumatic tire 60 may be deflated from a typical highway pressure of 38 psi (262 kpa) to a useful low tire pressure of 14 psi (96 kpa). By doing so, it has been shown that the footprint of the pneumatic tire 60 increases by about 37%. Even greater increases in the size of the footprint can be obtained by lowering the pneumatic tire 60 pressure to 10 psi (69 kpa) to increase the pneumatic tire footprint by as much as 55%.

Figure 2:
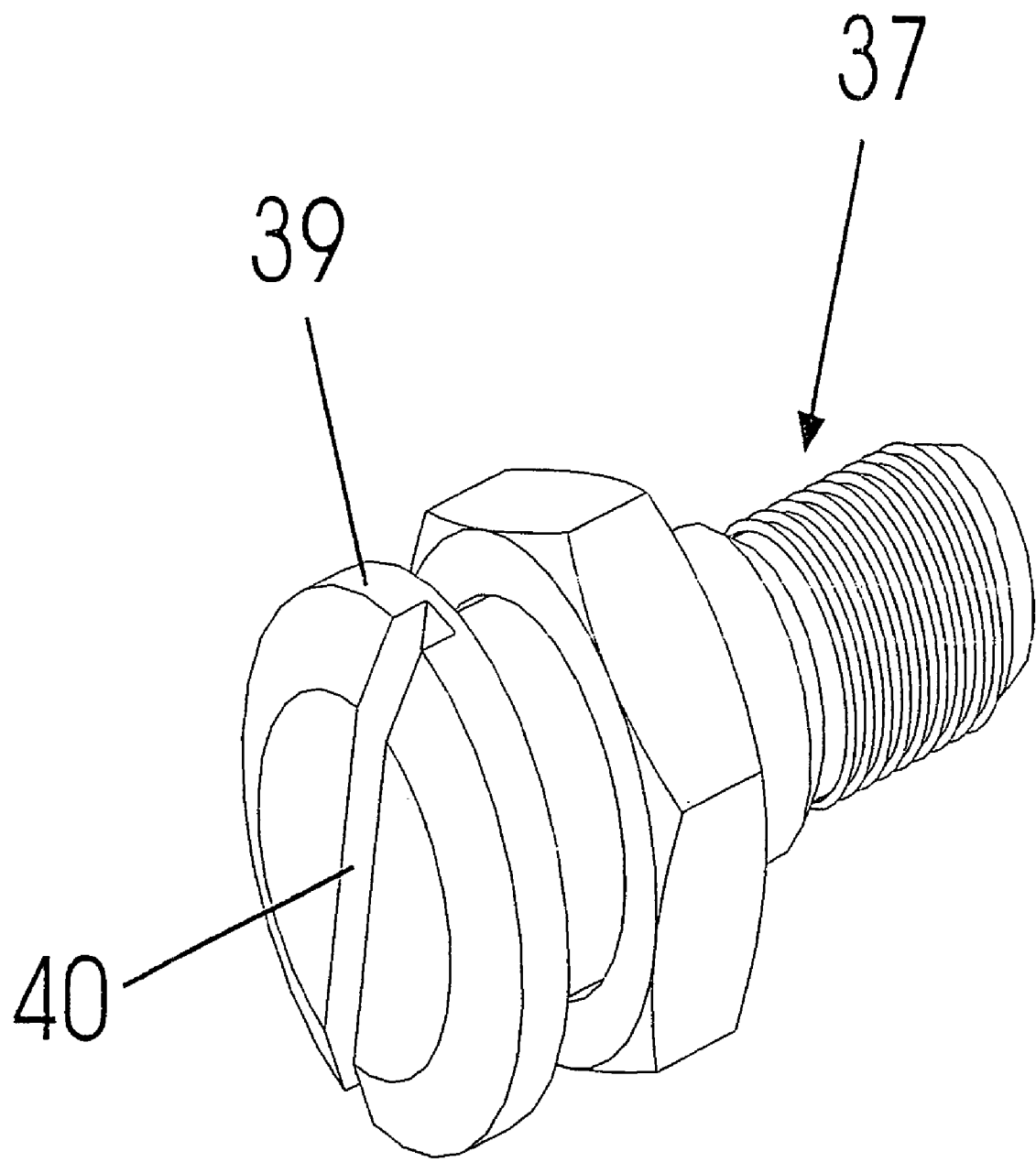
FIG. 2 is a perspective view of an insert valve showing a particular base configuration.

As shown in FIG. 2, the base 39 of the insert valve 37 includes air escape means 40 in the form of an elongate groove thereby improving the passage of air or gas into and out of the base portion 39 of the insert valve 37. In any event, where the apron 36 is made of soft, relatively open weave material, the passage of air can be forced through the apron 36 material.

Figure 3:
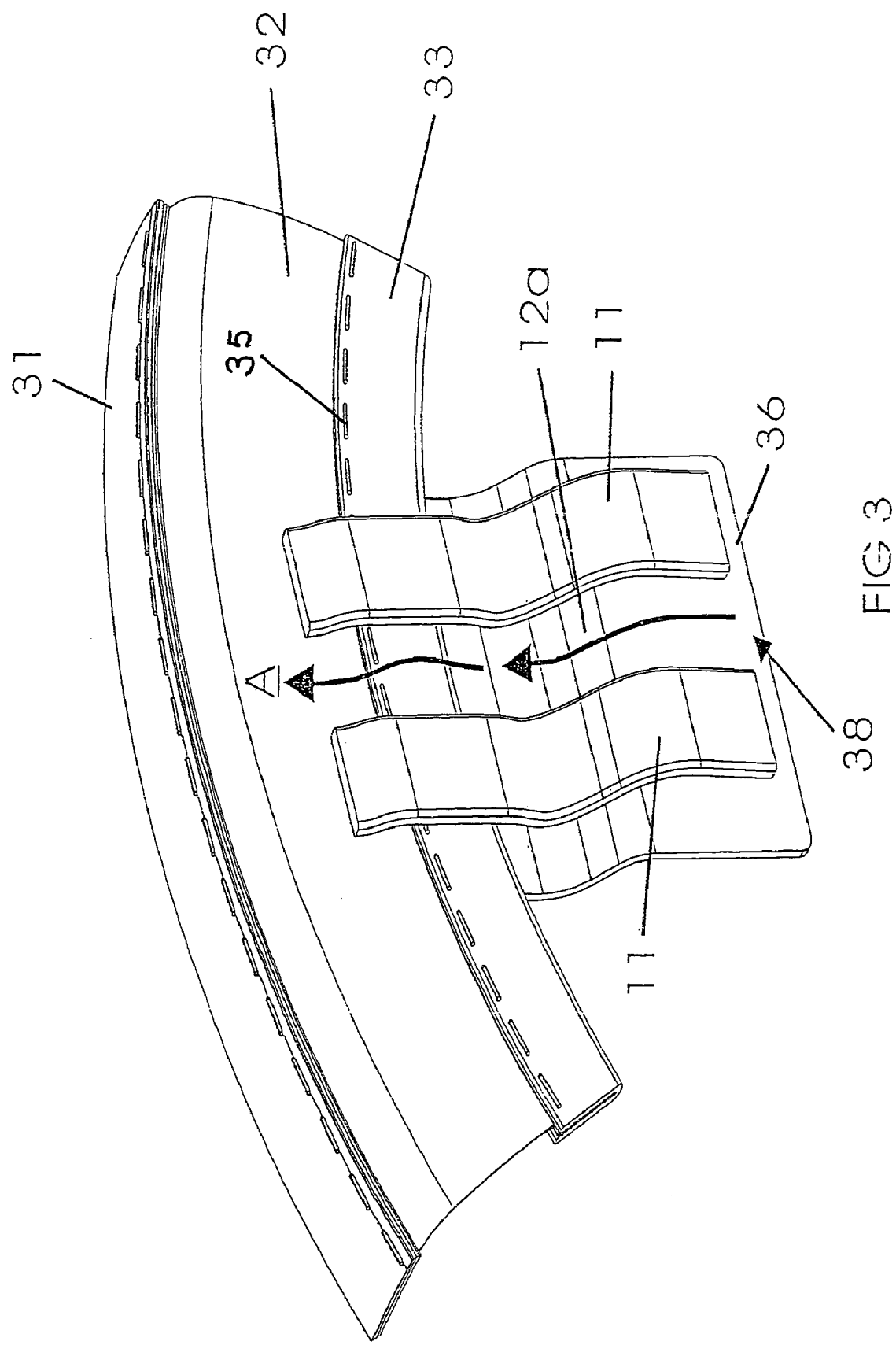
FIG. 3 is a schematic front view of a bead spacer according to the first embodiment.

In FIG. 3 the operation of the first embodiment can be clearly seen in which the passage 12a provides communication between the valve area 38 and the internal area A.

Figure 4:
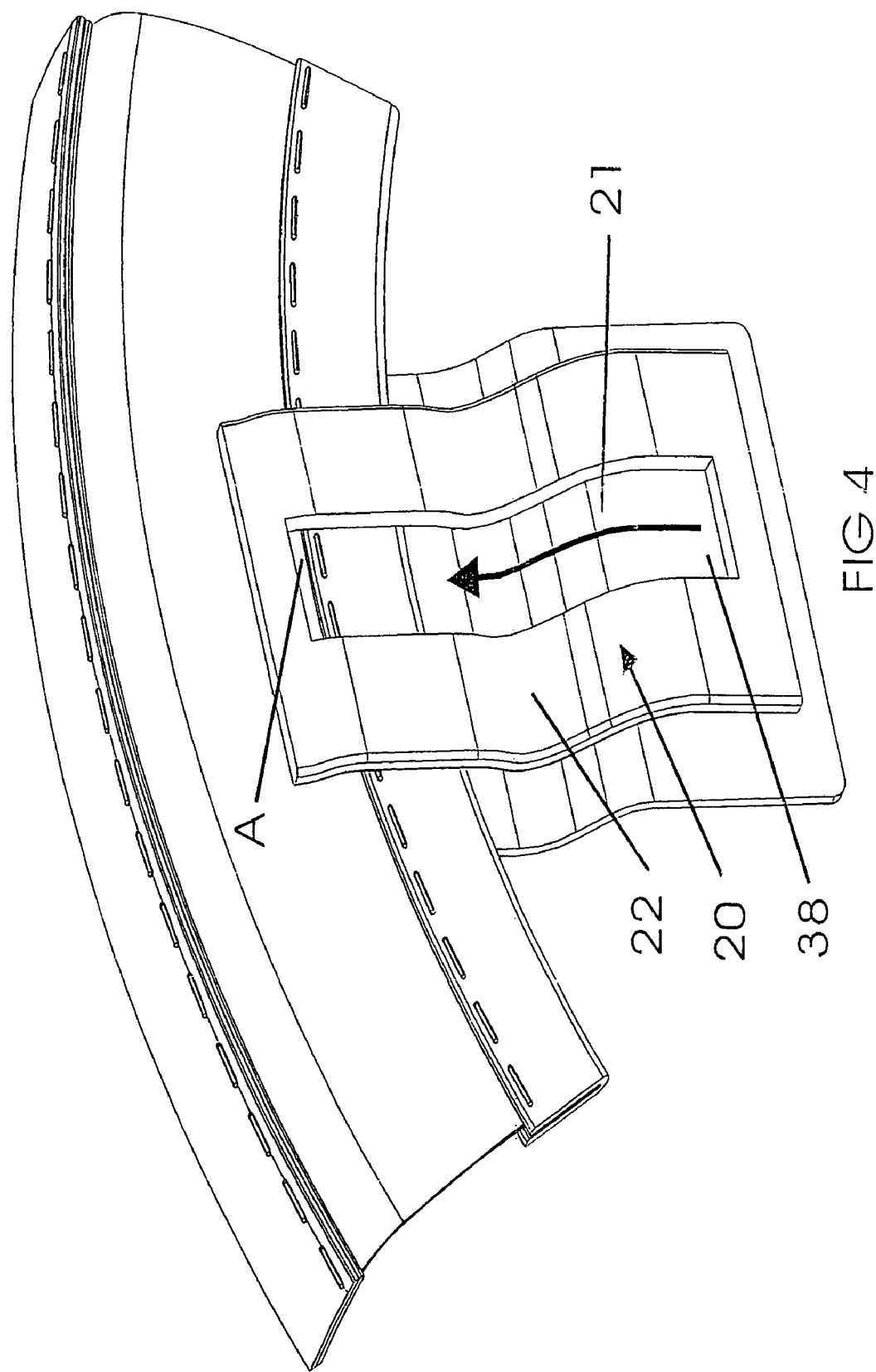
FIG. 4 is a schematic front view of a bead spacer according to a second embodiment.

In FIG. 4, there is shown a second embodiment in which a bead spacer 20 includes a closed elongate slot 21 defining the passage for communication between area 38 and area A. The second embodiment has the advantage of standardising the gap or passage way defined between the spacer sides 22 forming the elongate spacers so that, in installation, an operator is not permitted to inadvertently set the elongate spacer sides 22 too far apart or too close together.

Figure 5:
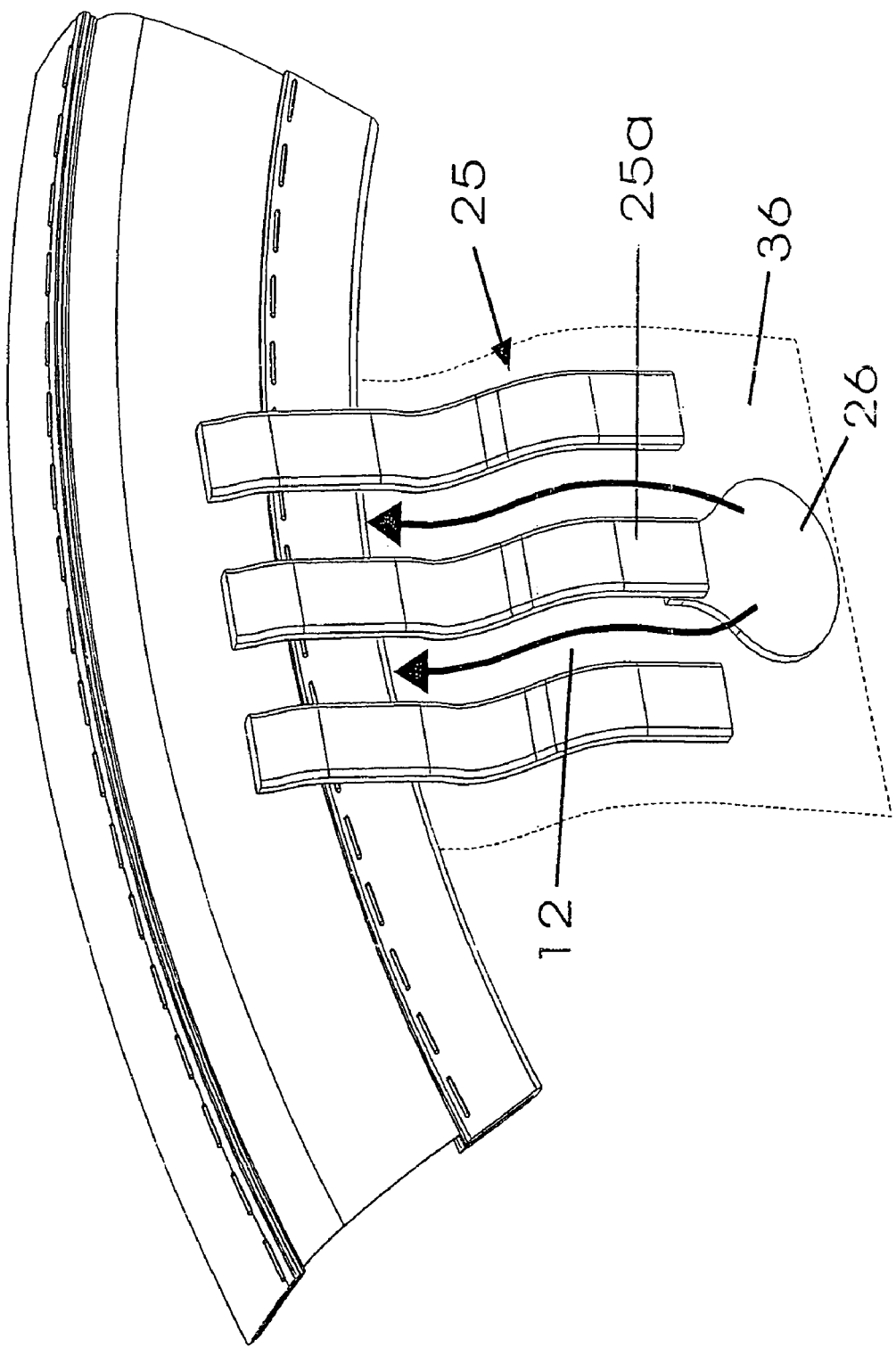
FIG. 5 is a schematic front view of a bead spacer according to a third embodiment.

In FIG. 5 there is shown an arrangement with more than two elongate spacers 25. To the central elongate spacer 25a at its free end is attached a short apron 26 to protect the inner tube 70 against the insert valve base 39. Although this arrangement is useful where the location of the area 38 is standardised, in applications where the size and type of the wheel rim 50 varies, the larger apron 36 of the first embodiment is most desirable.

Figure 6:
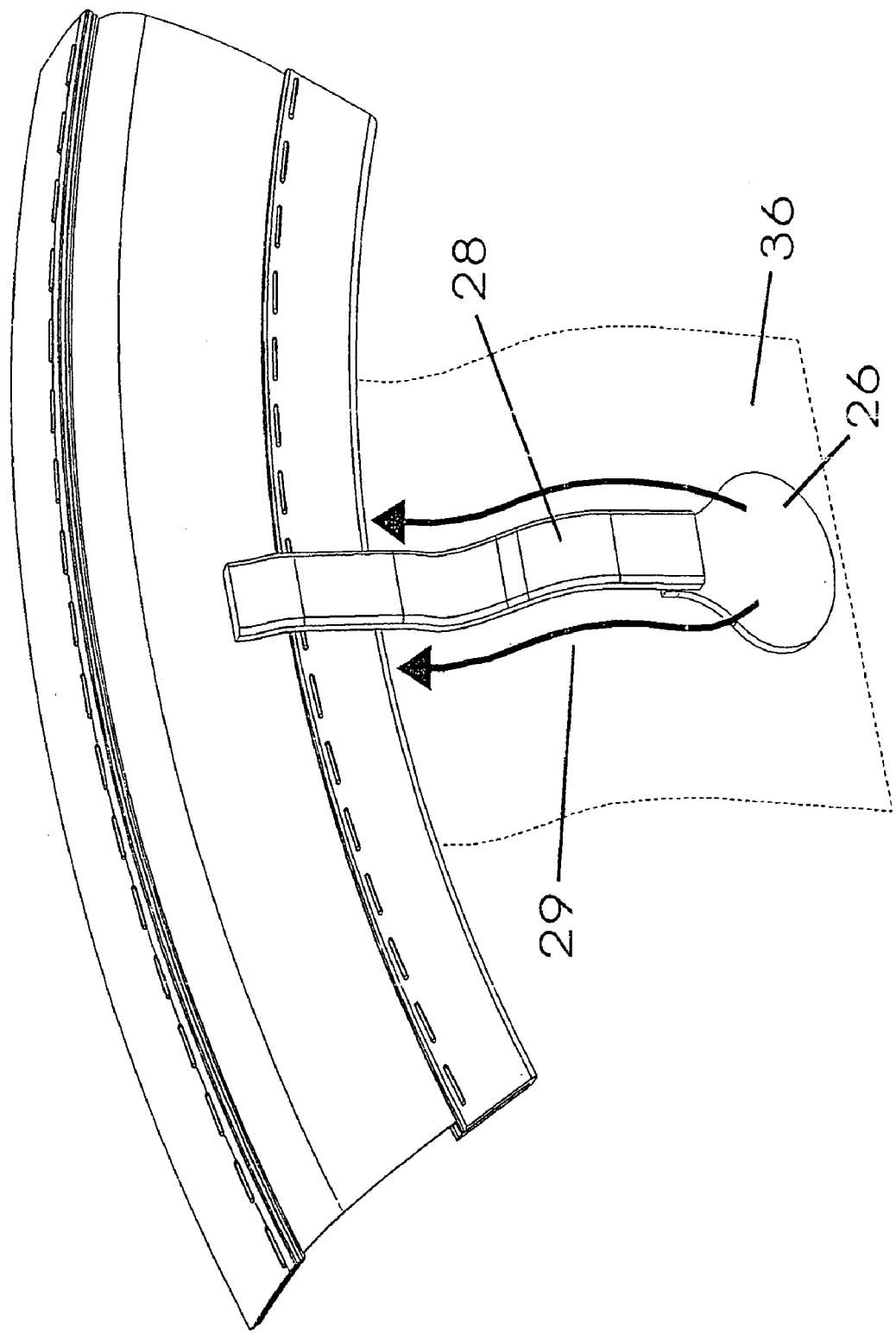
FIG. 6 is a schematic front view of a bead spacer according to a fourth embodiment.

In the fourth embodiment shown in FIG. 6, the bead spacer may comprise a single elongate spacer 28 of sufficient depth or thickness to define narrow passageways 29 either side thereof. Advantageously, the single elongate spacer 28, where made from sufficiently flexible and foldable material, can be folded over in manufacture to increase its spacing effect.

Although many materials will be suitable for the insert casing, the desirability for lightweight, non-extensible materials makes woven, synthetic or natural fibres most advantageous. In a particularly preferred embodiment, the side wall 32 and inner lining adapted to bear against the inner tube 70 is made from 100% polyester woven fabric (500 DR×500 DR). The wide band 31 limiting radial expansion of the inner tube 70 may be made from 100% polyester narrow woven fabric. The insert bead 33 may be made from 100% polyester narrow woven fabric. The elongate spacers 11, 22, 25, 28 33 may also be made from 100% polyester narrow woven fabric, although other materials are envisaged as being within the scope of the invention. As the person skilled in the art will appreciate, other materials will be suitable, particularly those having utility in applications requiring similar properties.

As previously described, where the material is sufficiently flexible, the elongate spacers 11, 22, 25, 28 may be folded over one or more times to increase their capacity to define air passageways 12, 21, or 29 having good communication characteristics.

When used in this specification and claims, the terms "comprises" and "comprising" and variations thereof mean that the specified features, steps or integers are included. The terms are not to be interpreted to exclude the presence of other features, steps or components.

It is to be understood that various alterations, modifications and/or additions may be made to the features of the possible and preferred embodiment(s) of the invention as herein described without departing from the spirit and scope of the invention.

Orientational terms used in the specification and claims such as vertical, horizontal, top, bottom, upper and lower are to be interpreted as relational and are based on the premise that the component, item, article, apparatus, device or instrument will usually be considered in a particular orientation, typically with the bead spacer uppermost.

What is claimed is:

1. A beadlock comprising an insert casing and a bead spacer for providing an air passageway in a vehicle tire to be mounted on a wheel rim on which is located an insert valve and a rim lip for retention of the vehicle tire bead, said insert casing including an insert bead adapted to push against said tire bead and to hold said tire bead firmly against the inner surface of said rim lip, the inner wall of said vehicle tire and the outer surface of said insert casing defining an internal tire space to be pressurized for inflation of said vehicle tire or depressurized for the deflation of said vehicle tire via said insert valve, said tire bead and said insert bead interposed between said internal tire space and said insert valve, said bead spacer extending from said insert bead to a valve area to define at least one air passageway for communication of said internal tire space with said insert valve, wherein said bead spacer is made of material sufficiently flexible to substantially conform to the contours of said wheel rim and sufficiently incompressible in at least one dimension to provide said air passageway, wherein said bead spacer comprises a pair of parallel rectangular strips defining said air passageway therebetween.

2. A beadlock comprising an insert casing and a bead spacer for providing an air passageway in a vehicle tire to be mounted on a wheel rim on which is located an insert valve and a rim lip for retention of the vehicle tire bead, said insert casing including an insert bead adapted to push against said tire bead and to hold said tire bead firmly against the inner surface of said rim lip, the inner wall of said vehicle tire and the outer surface of said insert casing defining an internal tire space to be pressurized for inflation of said vehicle tire or depressurized for the deflation of said vehicle tire via said insert valve, said tire bead and said insert bead interposed between said internal tire space and said insert valve, said bead spacer extending from said insert bead to a valve area to define at least one air passageway for communication of said internal tire space with said insert valve, wherein said bead spacer is made of material sufficiently flexible to substantially conform to the contours of said wheel rim and sufficiently incompressible in at least one dimension to provide said air passageway, further comprising an apron extending from said insert bead in use to said insert valve area to protect an inflatable inner tube located within said insert casing against damage from said insert valve.

3. A vehicle pneumatic tire and wheel rim assembly for low tire pressure or off-road uses comprising:
   a vehicle tire having two spaced peripheral tire beads;
   a wheel rim on which is located an insert valve and having spaced rim lips receiving therebetween and for retaining the tire beads;
   an inflatable inner tube surrounding said wheel rim and being located within said vehicle tire and between said peripheral tire beads; and
   a beadlock which comprises:
   an insert casing receiving said inner tube therein and having two spaced peripheral insert beads adapted to be pushed upon inflation of said inner tube against respective ones of said tire beads so as to hold said tire beads firmly against inner surfaces of the respective said rim lips,
   a bead spacer providing an air passageway to an internal tire space defined between an inner wall of said vehicle tire and the outer surface of said insert casing so that the internal tire space can be pressurized for inflation of said vehicle tire or depressurized for the deflation of said vehicle tire via said insert valve, one of said tire beads and its respective said insert bead being interposed between said internal tire space and said insert valve, and said bead spacer extending from said insert bead to an insert valve area where said insert valve is located whereby to define at least one air passage far communication of said internal tire space with said insert valve, said bead spacer being made of material sufficiently flexible to substantially conform to the contours of said wheel rim and sufficiently incompressible to provide said air passageway.

4. An assembly as claimed in claim 3 wherein said insert casing is made of a woven fiber material.

5. An assembly as claimed in claim 3 wherein said insert casing includes a strong, flexible and substantially inelastic circumferential band to limit radial expansion of the inner tube therein when inflated.

6. An assembly as claimed in claim 5 wherein said insert casing further includes two side walls of flexible material extending generally radially inwardly from opposite sides of the circumferential band and having said two peripheral insert beads extending around the peripheral edges of the side walls.

7. An assembly as claimed in claim 6 wherein each of said insert beads is made of a woven material strongly affixed to the peripheral edges of the side walls.

8. An assembly as claimed in claim 7 wherein said woven material is doubled over the peripheral edge of the respective side wall and stitching is applied to attach the doubled over layers of woven material to the peripheral edge of the respective side wall.

9. An assembly as claimed in claim 3 wherein said side walls are made of a flexible material of lighter gauge than the circumferential band so as to readily flex to enable the insert beads to move axially outwardly upon inflation of the inner tube to thereby bear against the peripheral tire beads of the vehicle tire and press the tire beads into strong engagement with the inner surfaces of the respective said rim lips.

10. An assembly according to claim 3, wherein said bead spacer is light weight and mounted to said insert bead.

11. An assembly according to claim 3, wherein said bead spacer includes at least two spacer members which together define therebetween said air passageway.

12. An assembly according to claim 3, wherein said bead spacer is made from a woven material.

13. An assembly according to claim 12, wherein said bead spacer is made from tightly woven material and is substantially incompressible in at least one dimension.

14. An assembly according to claim 12, wherein said bead spacer is in the form of one or more ribbons or strips of thick woven material.

15. An assembly according to claim 12, wherein said bead spacer is made from tightly woven polyester fabric.

16. An assembly according to claim 3, wherein said bead spacer is made from a solid polymeric material.

17. An assembly according to claim 3, wherein said bead spacer is in the form of a rectangular strip.

18. An assembly according to claim 3, and further including an apron extending from said insert bead to said insert valve area and overlying the adjacent surfaces of the wheel rim to protect said inner tube against damage from said insert valve.

19. A beadlock for a vehicle pneumatic tire and wheel rim assembly for low tire pressure or off-road uses said assembly in use comprising:
   a vehicle tire having two spaced peripheral tire beads;
   a wheel rim on which is located an insert valve and having spaced rim lips receiving therebetween and for retaining the tire beads;
   an inflatable inner tube surrounding said wheel rim and being located within said vehicle tire and between said peripheral tire beads;
   the beadlock comprising:
   an insert casing for receiving said inner tube therein, said insert casing including a strong, flexible and substantially inelastic circumferential band to limit radial expansion of the inner tube therein when inflated, and two side walls of flexible material extending generally radially inwardly from opposite sides of the circumferential band and having two peripheral insert beads extending around the peripheral edges of the side walls, the insert beads being adapted to be pushed in use upon inflation of said inner tube against respective ones of said tire beads so as to hold said tire beads firmly against inner surfaces of the respective said rim lips, and
   a bead spacer for providing an air passageway to an internal tire space defined between an inner wall of said vehicle tire and the outer surface of said insert casing radially beyond the circumferential band so that the internal tire space can be pressurized for inflation of said vehicle tire or depressurized for the deflation of said vehicle tire via said insert valve, whereby in use one of said tire beads and its respective said insert bead is interposed between said internal tire space and said insert valve, and said bead spacer can extend from said insert bead to an insert valve area where said insert valve is located whereby to define at least one air passage for communication of said internal tire space with said insert valve, said bead spacer being made of material sufficiently flexible to substantially conform to the contours of said wheel rim and sufficiently incompressible to provide said air passageway.

20. A beadlock as claimed in claim 19 wherein said insert casing is made of a woven fiber material.

21. A beadlock as claimed in claim 20 wherein said side walls are made of a flexible material of lighter gauge than the circumferential band so as to readily flex to enable the insert beads to move axially outwardly upon inflation of the inner tube to thereby bear against the peripheral tire beads of the vehicle tire and press the tire beads into strong engagement with the inner surfaces of the respective said rim lips.

22. A beadlock as claimed in claim 19 wherein each of said insert beads is made of a woven material strongly affixed to the peripheral edges of the side walls.

23. A beadlock as claimed in claim 22 wherein said woven material is doubled over the peripheral edge of the respective side wall and stitching is applied to attach the doubled over layers of woven material to the peripheral edge of the respective side wall.

24. A method of operating a wheeled vehicle having pneumatic tires on the wheels thereof with the inflation pressures of the pneumatic tires being significantly lowered from normal operating tire inflation pressures to thereby substantially increase the foot print of the pneumatic tires to thereby increase traction and/or provide greater Cushioning, each wheel of the vehicle having a vehicle pneumatic tire and wheel rim assembly comprising: a vehicle tire having two spaced peripheral tire beads; and a wheel rim on which is located an insert valve and which has spaced rim lips receiving therebetween and retaining the vehicle tire beads; said method comprising the steps of:

providing for each vehicle wheel and locating within the tire of each wheel:

an inflatable inner tube surrounding said wheel rim and located within said vehicle tire and between said peripheral tire beads; and a beadlock which includes an insert casing receiving said inner tube therein and having two spaced peripheral insert beads on opposite sides of said inner tube, and a bead spacer providing an air passageway to an internal tire space defined between an inner wall of said vehicle tire and the outer surface of said insert casing so that the internal tire space can be pressurized for inflation of said vehicle tire or depressurized for the deflation of said vehicle tire via said insert valve, one of said tire beads and its respective said insert bead being interposed between said internal tire space and said insert valve, and said bead spacer extending from said insert bead to an insert valve area where said insert valve is located whereby to define at least one air passage for communication of said internal tire space with said insert valve, said bead spacer being made of material sufficiently flexible to substantially conform to the contours of said wheel rim and sufficiently incompressible to provide said air passageway;

inflating said inner tube so that the inner tube is confined against substantial radial expansion by said insert casing and expands axially to push the peripheral insert beads of the insert casing against respective ones of the tire beads so as to hold the tire beads firmly against the inner surfaces of the respective rim lips of the wheel rim whereby the insert casing adopts a low profile within the vehicle tire;

pressurizing the internal tire space by means of said insert valve to a relatively low pressure and thereafter operating the vehicle whereby the vehicle tire is securely retained by the beadlock to the wheel rim; and at the end of a period of operation of the vehicle with the tires inflated to a relatively low pressure, increasing the inflation pressure in the internal tire space of each tire via said insert valve for further operation of the vehicle at normal operating tire inflation pressures.

25. A method as claimed in claim 24 wherein the vehicle is operated in an off road environment with the tires being deflated for increasing the footprint of each tire and thereby increasing traction.

26. A method as claimed in claim 24 wherein for each vehicle tire said inner tube remains permanently inflated irrespective of the use to which the vehicle is being put and irrespective of whether the inflation pressure in the internal tire space is relatively low or deflated for increased tire footprint or is relatively highly inflated for uses requiring smaller tire footprint.

* * * * *